United States Patent [19]

McKendrick

[11] 4,409,005

[45] Oct. 11, 1983

[54] METHOD AND APPARATUS FOR SEPARATING LIQUID AND SOLID CONTAMINANTS FROM A FLOWING GAS

[76] Inventor: Lorne J. McKendrick, 7724 Merriman Rd., Westland, Mich. 48185

[21] Appl. No.: 280,880

[22] Filed: Jul. 6, 1981

[51] Int. Cl.³ .............................................. B01D 50/00
[52] U.S. Cl. ........................................... 55/1; 55/218; 55/337; 55/432; 55/466; 55/DIG. 17; 137/203; 137/624.11
[58] Field of Search ................... 55/18, 160, 184, 186, 55/210, 218, 271, 337, 432, 421, 466, DIG. 17, 272.1, 97; 210/138; 137/203, 624.11; 251/30

[56] References Cited

U.S. PATENT DOCUMENTS

| | | | |
|---|---|---|---|
| 1,994,110 | 3/1935 | Pittman | 55/184 |
| 3,410,301 | 11/1968 | Merriner et al. | 137/624.11 |
| 3,483,673 | 12/1969 | Wellman | 55/218 |
| 3,507,098 | 4/1970 | Veres et al. | 55/421 |
| 3,575,199 | 4/1971 | Beattie | 137/203 |
| 3,874,859 | 4/1975 | Krause | 55/218 |
| 4,018,579 | 4/1977 | Hofmann | 55/213 |
| 4,135,542 | 1/1979 | Chisholm | 55/432 |
| 4,204,846 | 5/1980 | Brenholt | 55/272 |
| 4,226,715 | 10/1980 | Niederer et al. | 210/783 |
| 4,295,488 | 10/1981 | Book | 251/30 |

FOREIGN PATENT DOCUMENTS 2837080  3/1979  Fed. Rep. of Germany ...... 137/203

*Primary Examiner*—David L. Lacey
*Attorney, Agent, or Firm*—Gifford, VanOphem, Sheridan & Sprinkle

[57] ABSTRACT

A separator device, and a method, for removing water and foreign matter entrained in a compressed fluid is disclosed. The device includes a housing having an inlet port fluidly connected to the compressed fluid source, an outlet port and a chamber fluidly connected to the inlet and outlet ports. A mechanism is provided for separating water entrained in the compressed fluid and for collecting the separated water. Finally, a mechanism periodically purges the collected separated water from the device. The water is, preferably, atomized as it is released from the device.

7 Claims, 3 Drawing Figures

METHOD AND APPARATUS FOR SEPARATING LIQUID AND SOLID CONTAMINANTS FROM A FLOWING GAS

FIELD OF THE INVENTION

The present invention relates to an apparatus and method for separating entrained particulate matter from a conveying fluid and, more specifically, to an apparatus and method for periodically removing liquid contaminant from air.

BACKGROUND OF THE INVENTION

In the production of compressed air for air tools to be used in manufacturing plants and the like, the air is drawn from the atmosphere and compressed by a suitable compressor, such as a reciprocating piston, screw type, sliding vane type, centrifugal type, or axially staged blades. This compressed air, however, contains supersaturated water vapor which condenses upon cooling, which must be removed from the air system. After the removal of the supersaturated water vapor, compressed air is still saturated with water vapor. Thus, with a slight decrease in the temperature of the compressed air, more condensate water is formed, which must be removed from the system. If the water is not removed from the system, there is a tendency for the air passages to become blocked with water. This water can reach the mechanical drive components of the air tools, which prevents their operation. In addition, it is conventional to put lubricators in the air lines to provide the tools with a slight amount of oil mist in the compressed air. However, when the condensed water passes through and collects in the lubricator, an additional problem occurs. That is, since the oil is lighter than water, the oil floats on top of the water and the air tools thus receive water instead of lubricant in the compressed air. This has a very detrimental effect on tools and necessitates very costly repairs.

There are several known prior art devices which seek to avoid the above-enumerated problems. All of these prior art devices accumulate a measured amount of liquid before releasing the accumulated fluid from the compressed air. These devices expel accumulated condensate fluid separated from the compressed air by a float mechanism or by sensitivity to fluid pressure differential which is proportional to the amount of condensate fluid trapped. However, water condensate devices utilizing the aforementioned mechanism are not reliable since the pressure differential mechanisms are subject to clogging and the float mechanisms are subject to seizing. Thus, the aforementioned mechanisms fail to open or, if they open, they fail to close again because of dirt or moisture interfering with the operation of the mechanism.

SUMMARY OF THE INVENTION

The present invention is directed to an apparatus for separating entrained contaminant matter from a conveying fluid by means of an intermittent self purging water ejector mechanism which operates at a predetermined time interval to eject the accumulated water condensate therefrom and to trap foreign matter entrained in the conveying fluid.

The present invention is directed to an apparatus for separating entrained contaminant matter from a conveying fluid. The apparatus includes a housing having a fluid inlet, a fluid outlet, and a portion defining a chamber fluidly connected to the fluid inlet and the fluid outlet. In addition, a mechanism is mounted in the chamber for separating the entrained contaminant matter from the conveying fluid as the conveying fluid is passed through the housing. Finally, a mechanism is mounted in fluid communication with the chamber, which periodically purges the separated entrained contaminated matter from the chamber at a predetermined time interval.

It is, therefore, a primary object of the present invention to provide an apparatus for separating entrained contaminant matter from a conveying fluid which periodically purges the separated entrained contaminant matter from the chamber at a predetermined time interval.

The present invention is also directed to a method for removing entrained contaminant matter from a conveying fluid. The method includes the steps of separating the entrained contaminant matter from a conveying fluid; collecting the entrained contaminant matter in a chamber; and periodically purging the collected entrained contaminant matter from the chamber.

It is also an object of the present invention to provide a method for removing entrained contaminant matter from a conveying fluid by periodically purging the collected entrained contaminant matter from the chamber.

These and other objects of the present invention will become apparent by reference to the drawings and the description of the preferred embodiment.

DESCRIPTION OF A PREFERRED EMBODIMENT

In the following detailed description, certain specific terminology will be employed for the sake of clarity in describing a particular embodiment of the invention. However, it is to be understood that the same is not intended to be limiting and indeed should not be so construed, inasmuch as the invention is capable of taking many forms and variations within the scope of the appended claims. For example, the apparatus will be described in context with the apparatus and method for separating entrained contaminant matter which includes both liquid contaminants and solid particulate matter, from air. However, the invention as claimed is not limited to the filtration of any particular type of particulate matter, nor is the invention limited to the filtration of air—the filtration of other fluids, such as other compressed gases having entrained contaminant matter therein are also within the scope of the present invention.

Figure 1:
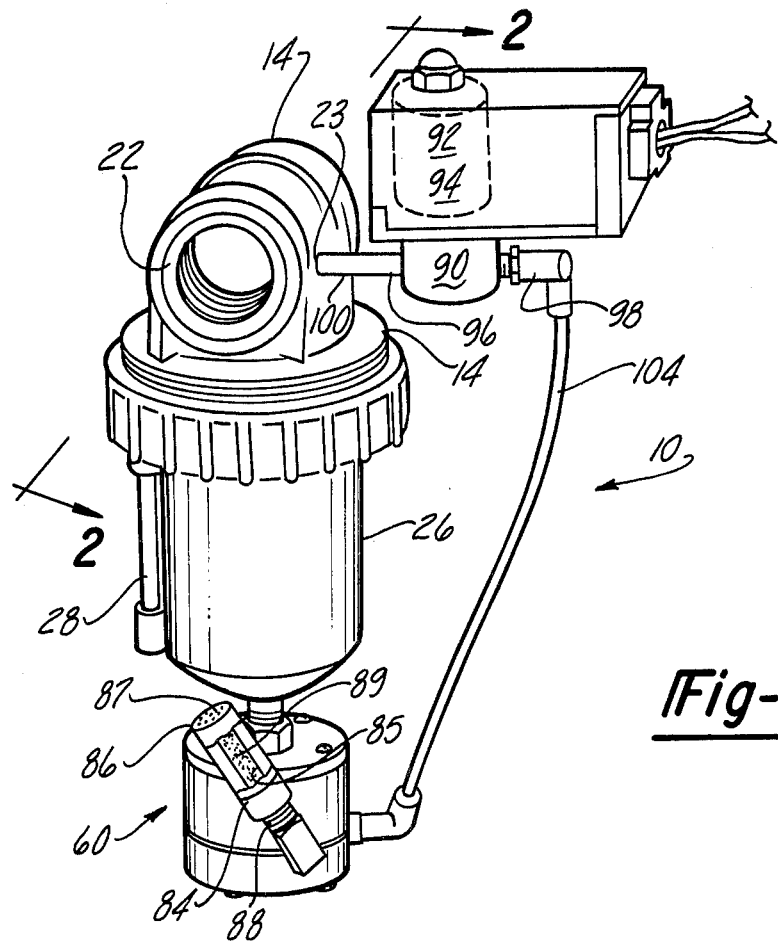
FIG. 1 is a perspective view of an apparatus for separating entrained contaminant matter from a conveying fluid according to the present invention.

Referring to the drawings, and in particular to FIG. 1, the apparatus for separating entrained contaminant matter from a conveying fluid according to the present invention is generally designated by the numeral 10. The apparatus includes a housing 14, a bowl 26, and periodic purging means 60. The housing 14 has an inlet 18 and an outlet 22. The inlet is fluidly connected to a source of conveying fluid (not shown). The conveying fluid may be, for example, compressed air having entrained contaminant matter such as solid particulate matter and liquid contaminants therein.

The bowl 26 is suitably connected to the base of the housing 14 as, for example, by a threaded connector to be described later on herein. The bowl 26 has a sight gage 28 which is fluidly connected at each end to the chamber 30 contained in the bowl 26.

Figure 2:
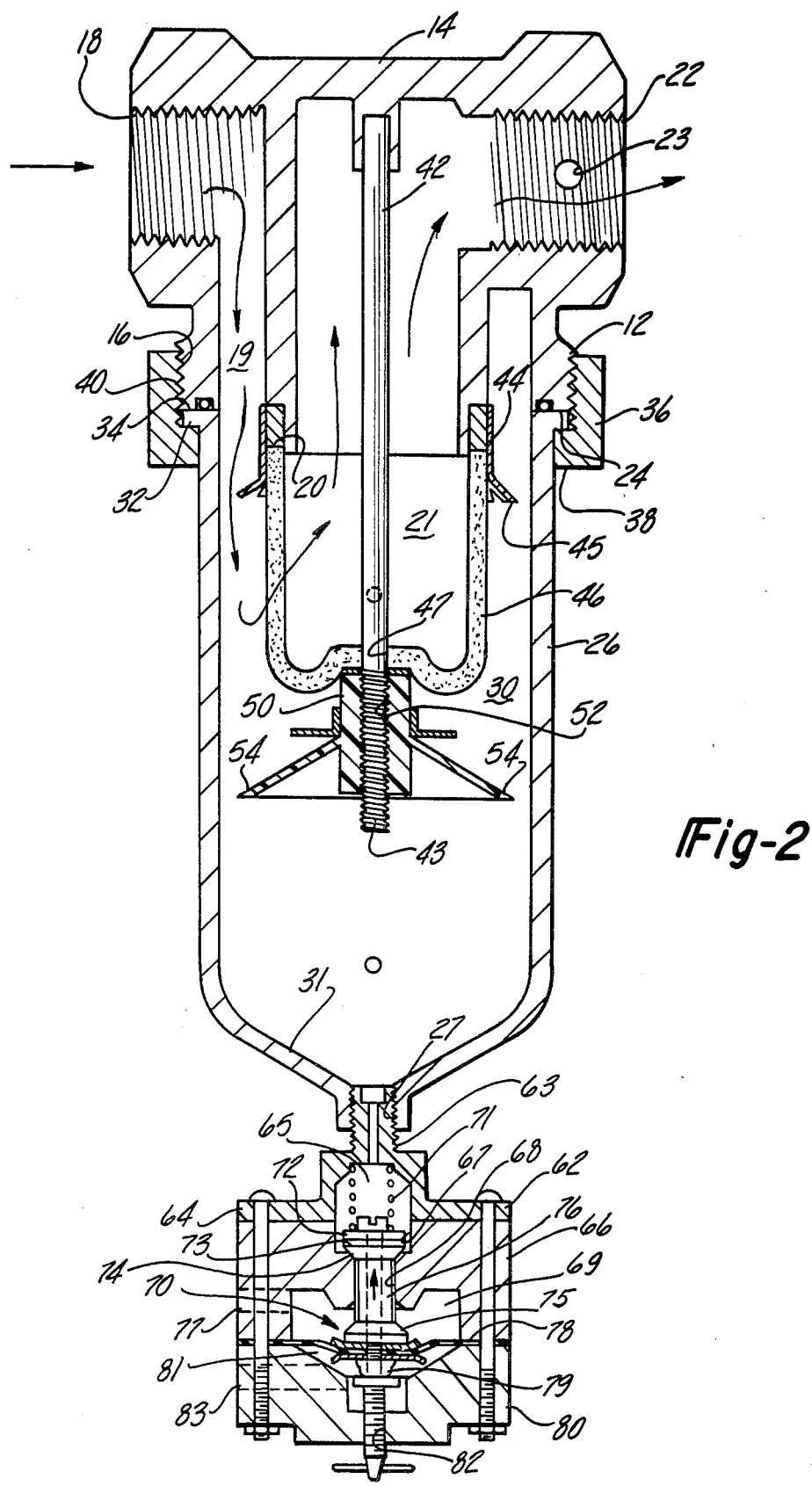
FIG. 2 is a cross-sectional view along line 2—2 of FIG. 1.

As best shown in FIG. 2, the base 12 of the housing 14 has helical thread means 16 formed on its outer periphery. The bowl 26 has an open end 24 which abuts against the base 12 of the housing 14. The open end 24 of the bowl 26 further has a radially extending portion 32 with a shoulder 34. An annular collar member 36 with an inwardly radially extending portion 38 is disposed around the bowl 26. The collar has an internal helical thread means 40 which threadably engages the exterior helical thread means 16 on the base 12 of the housing 14. Thus, when the collar member 36 is threadably engaged with the housing 14, the open end 24 abuts against the base 12 of the housing 14 to provide a fluid-tight connection therebetween. Under certain conditions, however, it is preferable to insert an O-ring in an appropriate groove in the base 12 of the housing 14 or of bowl 26 to further assure a fluid-tight connection between the bowl 26 and the housing 14 when the collar member 36 is threadably engaged to the housing 14. The inlet 18 is fluidly connected to the chamber 30 through an outer annular passage 19. The outlet 22 is fluidly connected to the chamber 30 by means of an interior central passage 21.

Centrally disposed in the interior passage 21 is a stud member 42 which, at one end, is suitably connected to housing 14 (such as by soldering) and at the other end has a threaded portion 43. Between the outer annular passage 19 and the interior central passage 21 is a shoulder portion 20. An annular air deflecting member 44 comprising a plurality of angularly disposed blade members 45 on its periphery is mounted adjacent the shoulder portion 20.

A barrel-shaped filter member 46 having an open end and a closed end with a central aperture 47 therein is disposed over the thread member 42 so that the open end abuts the shoulder portion 20. The filter member 46 is preferably a sintered bronze element which filters 40 micron sized solid particles from the conveying fluid. Optionally, the filter member may be a glass filter element and different sized hole openings in the filter element may be provided to meet particular applications.

The filter member 46 is secured to the stud member 42 by means of a deflecting member 50. The deflecting member 50 comprises a central aperture with an internal thread 52 to engage the threaded portion 43 of the stud member 42. The deflecting member 50 further has a frustoconical surface which extends radially from the thread 52. With the deflecting member 50 suitably engaged to the stud member 42, the filter member 46 and the air deflecting member 44 are assembled to the housing 14. The deflecting member 50 further has a plurality of apertures 54 formed around the periphery of its frusto-conical surface.

When fluid containing contaminant matter therein is introduced into the inlet 18 of the housing 14, the air passes through the outer passage 19 and then into the chamber 30 of the bowl 26. The fluid then passes the air deflecting member 44 whose blade members 45 impart a swirl to the fluid which causes the heavier water particles to separate from the conveying fluid. Because the water particles are heavier than the conveying fluid, the water particles are separated from the air and collected on the walls of the bowl 26. Then, due to gravity, the water particles collect at the bottom 31 of the chamber 30. The frusto-conical surface of the deflecting member 50 prevents the conveying fluid from re-entraining the water particles into the conveying fluid again by providing a quiet zone or space wherein the water particles are collected. The conveying fluid then passes through the filter member 46 and thence into the interior passage 21 which is connected to the outlet 22 of the housing 14.

Periodic purging means 60 is provided to remove the collected moisture or water particles from the bottom 31 of the chamber 30. The bowl 26 is formed with a central threaded aperture 27 which is fluidly connected to the bottom 31 of the chamber 30.

A dump valve 62 having a threaded inlet 63 is threadably connected to the threaded aperture 27 of the bowl 26. The dump valve 62 comprises four members: a top plate 64, an intermediate plate member 66, valve means 70, and a bottom plate member 80. The top plate 64 has a central cavity 65 which fluidly communicates with the threaded inlet 63. The intermediate plate 66 is mounted adjacent the top plate 64. The intermediate plate 66 also has a top central cavity 67 which fluidly communicates with the central cavity 65 in the top plate 64. The intermediate plate 66 also has a bottom central cavity 69 which communicates with the top central cavity 67 by means of a central bore 68. The valve means 70 comprises a threaded member 72 having a shoulder portion 73. The threaded member 72 has a longitudinally extending threaded portion extending from the shoulder portion 73. A first annular seal 74 is mounted adjacent the shoulder portion 73. The threaded member 72 is inserted into the top central cavity 67 so that that the longitudinally extending portion is disposed in the central bore 68 and extends through and into the bottom central cavity 69. An annular sleeve member 76 having a plurality of shoulder portions and a central bore is disposed around the longitudinally extending portion of threaded member 72 so as to centrally locate the longitudinally extending portion of the threaded member 72 in the central bore 68. The shoulder portions of the sleeve member 76 permit fluid communication between the top central cavity 67 to the bottom central cavity 69 through the central bore 68. A second seal 75, having a central bore therein, is centrally disposed about the longitudinal extending portion of the threaded member 72 in the bottom central cavity 69. The sleeve member 76 axially spaces the first seal 74 from the second seal 75. Thus, the threaded member 72 moves from a first axial postion wherein the first seal 74 abuts against the shoulder formed in the top central cavity 67 adjacent the central bore 68 to a second axial position wherein the second seal 75 abuts against the shoulder portion formed between the central bore 68 and the bottom central cavity 69. A biasing member 71 urges the threaded member 72 into the first axial position and is inserted into the top central cavity 67 so as to abut at one end against the top plate 64 and at the other end abut against the threaded member 72.

A diaphragm member 78 is interposed between the bottom plate member 80 and the intermediate plate member 66. The diaphragm member 78 is preferably made of a resilient material with a central aperture therein. The central aperture of the diaphragm member 78 is secured to the longitudinally extending portion of the threaded member 72 by means of a threaded nut 79. To enhance the life of the resilient diaphragm member 78, a pair of backing flanges are disposed one on each side of the diaphgram member 78 to support the diaphragm around the longitudinal extension of the threaded member 72.

The bottom plate member 80 is formed with a central cavity 81. Preferably, the cavity 81 is downward sloping as shown in FIG. 2. The bottom plate member 80 further has a central threaded aperture 82 which is in fluid communication with the central cavity 81. A radially extending aperture 83 extends from the outer periphery of the bottom plate member 80 to the central aperture 82.

An atomizer 84 (FIG. 1) is threadably connected to a threaded aperture 77 formed in the periphery of the intermediate plate 66. The aperture 77 extends to the bottom central cavity 69 for fluid communication between the cavity 69 and the atomizer 84. The atomizer 84 comprises a tubular member having a closed end 86 and an open end 88. The atomizer further has a central cavity 85 which extends from the open end 88 toward the closed end 86. The closed end 86 further has a plurality of apertures 87 formed therein which communicate with the cavity 85. A porous, fine mesh element 89 is disposed in the cavity 85 for a purpose to be described later herein.

A solenoid valve 90 having an electromagnetic coil 92 and a valve means 94 is mounted adjacent the outlet 22 of the housing 14. The solenoid valve 90 further has an inlet duct 96 and an outlet duct 98 opposite the inlet duct 96. The inlet duct 96 is fluidly connected to the outlet 22 through a radially disposed threaded aperture 23 in the housing 14 and a conduit 100 which threadably connects the inlet duct 96 to the threaded aperture 23. The electromagnetic coil 92 is of conventional design and is connected to an electric means not shown. A timer 102 is mounted adjacent the solenoid valve 90 and is electrically connected to the electromagnetic coil 92. The time is preferably formed from a solid state chip. Those skilled in the art will recognize that the solid state chip may be selected to actuate the electromagnetic coil 92 of the solenoid valve 90 at any preselected time cycle. For example, by way of nonlimiting example, the timer 102 of the present invention is preferably set for a 90 second time cycle. Thus, electric current from the electric source is fed to the electromagnetic coil 92 at an interval of every 90 seconds for a selected time period of, for example, 10 seconds. When the electromagnetic coil 92 is actuated, the valve means 94 which is disposed between the inlet duct and the outlet duct 98 is actuated to permit fluid communication between the inlet duct 96 and the outlet duct 98 for a selected time period. The outlet duct 98 is connected by means of a conduit 104 to the radially extending aperture 83 in the bottom plate member 80.

Figure 3:
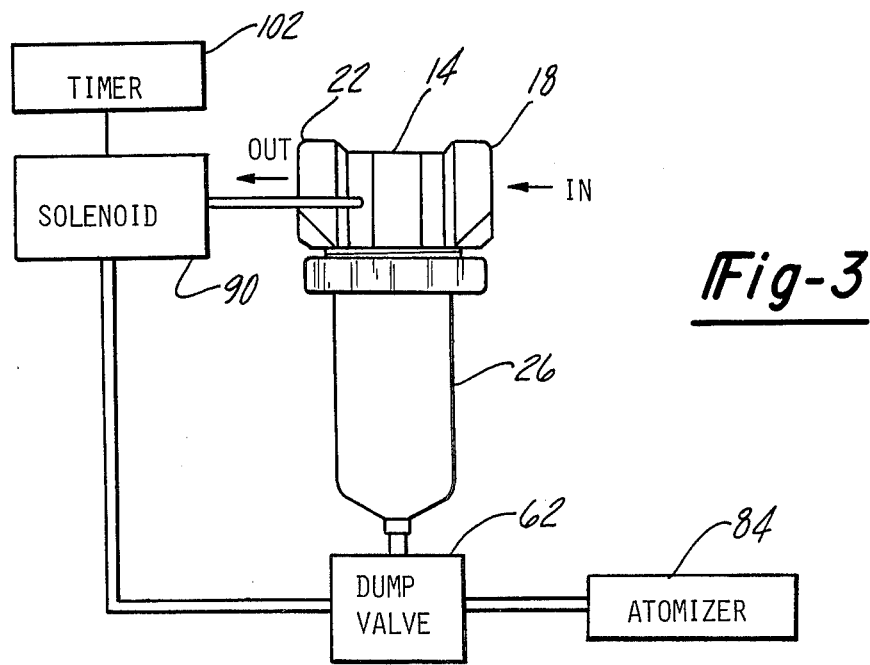
FIG. 3 is a schematic representation of the purging system of the present invention.

In operation, the housing is connected to the conveying fluid containing the contaminant matter and the conveying fluid then enters into the inlet 18, thence into the outer passage 19 and into the chamber 30 of the bowl 26. The conveying fluid is swirled by means of the air deflecting member 44 so that liquid contaminant matter in the conveying fluid, because of its inertia, is caused to separate from the conveying fluid. Thus, the liquid particulate matter or water particles are collected along the walls of the bowl member 26 so that the liquid by gravity collects at the bottom 31 of the chamber 30. To remove this liquid contaminant matter from the bowl 26 (as shown schematically in FIG. 3), the periodic purging means 60 is actuated to remove the collected liquid contaminant matter from the bowl 26. This is accomplished by means of a dump valve 62 which is periodically actuated by means of the timer 102 and the solenoid valve 90. When the preselected time cycle occurs, the solenoid valve is actuated for a selected time period which causes the valve means 94 to move from its normal position blocking flow between the inlet port and the outlet port to an open position. In its open position, the fluid from the outlet 22 flows through the conduit 100, thence into the inlet duct 96, then out the outlet duct 98 into conduit 104. The conduit 104 is connected to the central cavity 81 in the bottom plate member 80. This causes the diaphragm 78 to move axially toward the intermediate plate member 66. Because the diaphragm 78 is connected to the threaded member 72, this also causes the threaded member 72 to move from its first axial position wherein the first seal 74 abuts against the shoulder formed in the top central cavity adjacent the central bore 68 to a second axial position permitting flow communication between the top central cavity 67, the central bore 68, and the bottom central cavity 69. Thus, liquid contaminant matter collected in the bottom 31 of the chamber 30, is permitted to flow by gravity into the central cavity 65 of top plate member 64 and the top central cavity 67 of the intermediate plate 66. Thus, when the timer 102 actuates the solenoid valve 90 to permit conveying fluid to move the diaphragm 78 of the dump valve 62, liquid contaminant matter is permitted to move through the central bore 68 and into the bottom central cavity 69. Since pressurized conveying fluid is contained in the housing 14, the collected liquid contaminant matter in the bottom central cavity 69 is then forced by the conveying fluid into the cavity 85 of the atomizer 84. Since there is a pressure differential between the fluid in the cavity 85 and the surrounding atmosphere around the atomizer 84, the liquid contaminant matter is then forced through the porous material 89 and thence through the aperture 87 in the closed end 86 of the atomizer 84. Thus, the dump valve 62 moves the liquid contaminant matter to atmosphere by means of the atomizer 84 so that all the liquid contaminate matter is purged to the atmosphere as a mist. Because of the frequency of operation of the dump valve, the apparatus 10 does not clog up or seize as in the case of conventional automatic dump filter units. Preferably, the apparatus 10 is mounted in the main headers of the conveying fluid, which feed a plurality of pneumatic tools. Thus, a sufficient volume of conveying fluid passes through the apparatus 10 to enhance its effectiveness of separating liquid and particulate matter from the fluid.

While the invention has been described in connection with a preferred embodiment or method, it will be understood that it is not intended to limit the invention to that embodiment or procedure.

What is claimed is:

1. A device for separating solid particulate material and entrained liquid from an airstream comprising:

a housing defining an interior chamber having a bottom portion, said housing having an inlet and an outlet open to said chamber, means contained within said housing chamber for separating solid particulate matter and entrained liquid from said airstream so that said separated solid particulate matter and said liquid collect in said bottom portion of said chamber, means for periodically purging liquid and solid particulate matter from the bottom portion of said chamber comprising a normally closed dump valve fluidly connected to said bottom portion of said chamber, means for moving said dump valve to an open position comprising an electrically operated valve having an inlet duct fluidly connected to said chamber and an outlet duct fluidly connected to said dump valve and timer means for periodically actuating said electrically operated valve.

2. The device as defined in claim 1 wherein said electrically operated valve comprises a solenoid valve.

3. An apparatus for separating entrained contaminant matter from a conveying gaseous fluid, said apparatus comprising:
 a housing having a fluid inlet, a fluid outlet, and a portion defining a chamber fluidly connected to said fluid inlet and said fluid outlet;
 means, mounted in said chamber, for separating entrained contaminant matter from said conveying fluid as said conveying fluid is passed through said housing;
 means mounted in fluid communication with said chamber for periodically purging said separated entrained contaminant matter from said chamber at a predetermined time interval comprising a dump valve fluidly connected to said chamber,
 means for pneumatically actuating said dump valve; and
 wherein said pneumatic actuating means comprises means for periodically bleeding a portion of air from said outlet to said dump valve.

4. The device as defined in claim 3 wherein said pneumatic actuating means further comprises:
 an electrically operated solenoid valve fluidly connected between said fluid outlet and said dump valve, and
 timer means connected to said electrically operated solenoid valve for periodically actuating said electrically operated solenoid valve at said predetermined time interval.

5. The device as defined in claim 4 and comprising means, fluidly connected to said dump valve, for atomizing a liquid contaminant purged from said chamber.

6. A method for removing entrained contaminant matter including a liquid contaminant from a conveying gaseous fluid, said method comprising the steps of:
 separating the entrained contaminant matter in a chamber; and
 periodically purging the separated liquid contaminant matter from said chamber wherein said periodically purging step further includes removing the separated entrained contaminant liquid from said chamber and thereafter atomizing the separated entrained contaminant liquid into the atmosphere surrounding said chamber.

7. An apparatus for separating entrained contaminant matter and liquid from a gaseous conveying fluid, said apparatus comprising:
 a housing having a fluid inlet, a fluid outlet, and a portion defining a chamber fluidly connected to said fluid inlet and said fluid outlet;

means, mounted in said chamber, for separating entrained contaminant matter and liquid from said conveying fluid as said conveying fluid is passed through said housing;

means for periodically purging said separated entrained contaminant matter and liquid from said chamber at a predetermined time interval;

wherein said periodic purging means further comprises an electrically operated solenoid valve fluidly connected to said fluid outlet of said housing;

said purging means comprising a dump valve fluidly connected to said chamber, said dump valve further being fluidly connected to said electrically operated solenoid valve;

timer means, connected to said electrically operated solenoid valve, for periodically actuating said electrically operated solenoid valve at said predetermined time interval whereby said solenoid valve actuates said dump valve to eject separated entrained contaminant matter from said chamber;

wherein said periodic purging means further comprises means, fluidly connected to said dump valve, for atomizing the liquid purged from said chamber.

* * * * *

UNITED STATES PATENT AND TRADEMARK OFFICE
CERTIFICATE OF CORRECTION

PATENT NO. : 4,409,005

DATED : October 11, 1983

INVENTOR(S) : Lorne J. MCKendrick

It is certified that error appears in the above-identified patent and that said Letters Patent is hereby corrected as shown below:

```
Column 3, line 56 delete "frustoconical" insert
    --frusto-conical--.

Column 4, line 36  delete "that" first occurrence.

Column 5, line 51 after "duct" insert --96--.
```

Signed and Sealed this

Twentieth Day of July, 1993

Attest:

MICHAEL K. KIRK

*Attesting Officer*     Acting Commissioner of Patents and Trademarks